April 27, 1926.
A. P. DAVIS
FENCEPOST PRESERVING DEVICE
Filed Feb. 12, 1925
1,582,168
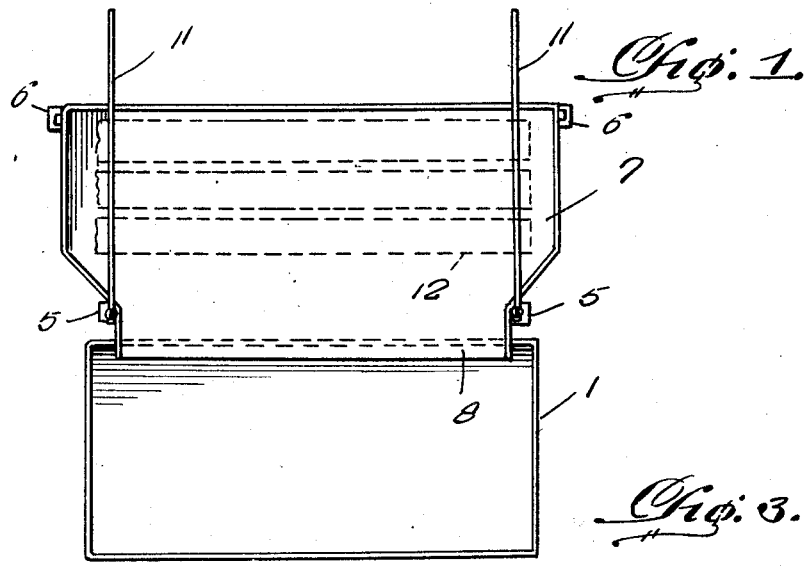
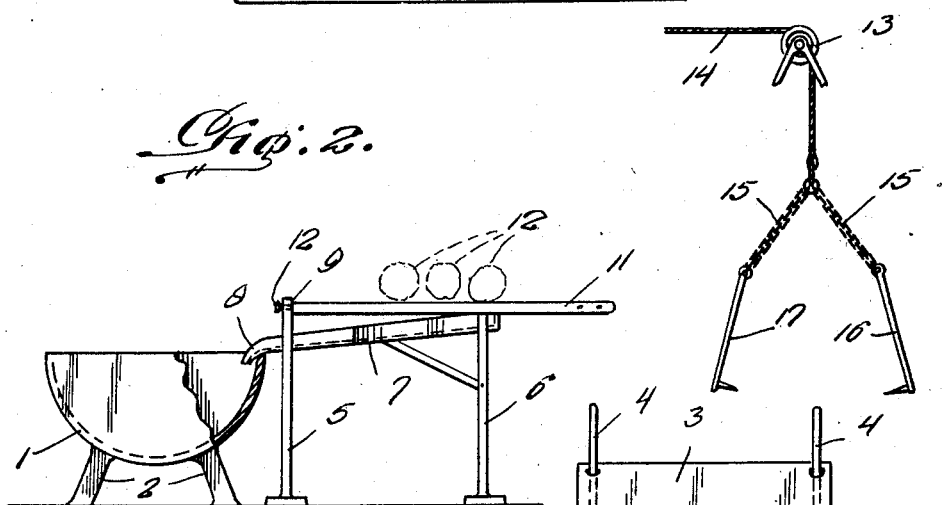
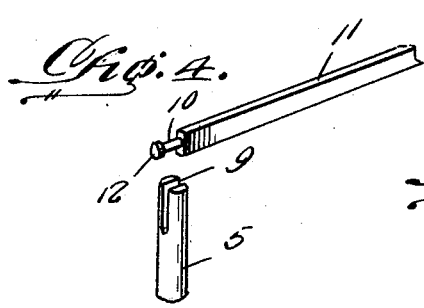
Inventor
A. P. Davis, Patented Apr. 27, 1926.

1,582,168

UNITED STATES PATENT OFFICE.

ALFRED POLK DAVIS, OF SAN AUGUSTINE, TEXAS.

FENCEPOST-PRESERVING DEVICE.

Application filed February 12, 1925. Serial No. 8,733.

*To all whom it may concern:*

Be it known that I, ALFRED POLK DAVIS, a citizen of the United States, residing at San Augustine, in the county of San Augustine and State of Texas, have invented certain new and useful Improvements in a Fencepost-Preserving Device, of which the following is a specification.

This invention relates to an improved device which may be conveniently designated as a fence post preserving device, although it may be specifically entitled as a creosote kettle for fence posts and the like.

The primary feature of the invention is a comparatively large tub or kettle into which a quantity of creosote is placed, this kettle being spaced by legs above the ground to permit a fire to be built therebeneath for boiling the creosote so that the logs or posts which are adapted to be emerged therein will be thoroughly saturated by this method.

A second feature of the invention is the provision of means for supporting the saturated post to permit effecting drying of the same, said means being disposed about a drip pan for collecting the surplus creosote and draining it back into the kettle.

Other features and advantages of the invention will become apparent from the following description and drawing.

In the accompanying drawing forming a part of this application and in which like numerals are employed to designate like parts throughout the same:

Figure 1 is a top plan view of a device constructed in accordance with the present invention.

Fig. 2 is an end elevation thereof, with a portion of the kettle broken away and shown in section.

Fig. 3 is a view showing a portion of a hoisting device used in connection with the invention.

Fig. 4 is a detail perspective view showing certain of the details.

Fig. 5 is a top plan view of a removable cover for the kettle.

Referring to the drawing in detail, it will be seen that the kettle is designated by the reference character 1, the same being substantially semi-circular in cross section. In practice this kettle will be comparatively large and sufficiently large to accommodate as many as fifty or sixty ordinary fence posts or logs. Of course, the kettle can be of some other configuration, but the shape shown is desirable.

On its bottom the kettle is provided with appropriate supporting legs two of which, as before stated, serve to space the bottom above the ground to permit the flames from a fire beneath to impinge thereon for boiling a quantity of creosote which is adapted to be placed therein. While discussing the kettle, I might direct attention to Fig. 5 wherein a removable cover 3 is shown, the same being adapted to overlie the open top of the kettle to retain the creosote fumes in the latter. The cover 3 being comparatively heavy, appropriate carrying poles or the like 4 will be provided for facilitating handling thereof. The poles may be removably connected to the cover in any desirable manner.

Disposed adjacent one side of the kettle are forward and rear vertical standards 5 and 6 respectively. These standards constitute a support for a drip pan 7 which is supported therefrom in a forwardly and downwardly inclined position. The discharge end of the pan overhangs one wall of the kettle and is formulated into a downturned spout 8 to facilitate return of the surplus creosote to the kettle.

As shown in Fig. 1, the outer or rear standards are disposed in outwardly spaced relation from the inner standards 5. Hence, the discharge spout 8 between the inner standards is comparatively narrow while the main body portion of the pan is comparatively long or wide so that the pan will extend completely beneath the posts. It will be noted, as shown in Fig. 5, that the upper ends of the standards 5 are bifurcated as at 9. Adapted to fit removably between the furcations are reduced cylindrical ends 10 of the inner ends of a pair of spaced parallel beams 11, the reduced ends being provided upon their extremities with retaining heads 12. As further shown in Fig. 1, the body portion of the beams 11 extend transversely across the drip pan 7 and rest upon the elongated outer wall of the latter, thus permitting it to function additionally as a support therefor.

Obviously, these beams serve as rests for the fence posts. To aid in inserting and removing the posts, I provide a hoisting member such as seen in Fig. 3. Referring to this figure it will be observed that I simply provide an appropriately supported pulley 13 over which a cable 14 is trained, the cable being connected with any suitable source of energy. One end of the cable hangs downwardly over the pulley and is connected to diverging chains 15 carrying hooked grapples 16. The hooks are adapted to be embedded in the ends of the posts so that the same may be dropped down into the boiling liquid or lifted out of the same and hoisted up and directed upon the beams 11.

When the posts are upon the beams they are exposed to the air for drying and surplus creosote drips therefrom into the pan and gravitates back into the kettle.

It is thought that careful consideration of the description in connection with the drawing will enable persons skilled in the art to which the invention relates to obtain a thorough understanding of the same. Therefore, a more lengthy description is thought unnecessary.

Although the preferred embodiment of the invention has been shown and described, it is to be understood that changes coming within the field of invention claimed may be resorted to if desired.

Having thus described my invention, what I claim as new is:—

A device of the class described comprising an open top kettle provided with supporting legs for spacing its bottom above the supporting surface, inner and outer pairs of vertical standards disposed on one side of the kettle, a drip pan supported from said standards and inclined toward the kettle for draining fluid into the latter, horizontal supporting beams attachably connected at their inner ends to the inner standards and having their opposite ends resting upon an upper edge of said pan, said beams being adapted to support the wood to be treated.

In testimony whereof I affix my signature.

ALFRED POLK DAVIS.